(12) United States Patent
Vaillant

(10) Patent No.: US 7,691,634 B2
(45) Date of Patent: Apr. 6, 2010

(54) METHOD, SYSTEM AND COMPONENT FOR CONTROLLING THE PRESERVATION OF A PRODUCT

(75) Inventor: Renaud Vaillant, Gentilly (FR)

(73) Assignee: Cryolog, Boulogne (FR)

( * ) Notice: Subject to any disclaimer, the term of this patent is extended or adjusted under 35 U.S.C. 154(b) by 1434 days.

(21) Appl. No.: 10/489,927

(22) PCT Filed: Sep. 16, 2002

(86) PCT No.: PCT/FR02/03145

§ 371 (c)(1),
(2), (4) Date: Mar. 16, 2004

(87) PCT Pub. No.: WO03/025529

PCT Pub. Date: Mar. 27, 2003

(65) Prior Publication Data

US 2004/0248305 A1    Dec. 9, 2004

(30) Foreign Application Priority Data

Sep. 17, 2001 (FR) .................................. 01 11985

(51) Int. Cl.
*C23F 11/18* (2006.01)
(52) U.S. Cl. ........................................................ 436/20
(58) Field of Classification Search ................... 436/20
See application file for complete search history.

(56) References Cited

U.S. PATENT DOCUMENTS 2,950,202 A * 8/1960 Brockmann .............. 435/287.6
5,238,272 A * 8/1993 Taylor ......................... 283/79

FOREIGN PATENT DOCUMENTS

| DE | 199 12 529 A | | 9/2000 |
|---|---|---|---|
| EP | 0 250 217 B1 | | 12/1987 |
| EP | 930489 A2 | * | 7/1999 |
| JP | 05-029075 | | 4/1993 |
| JP | 0509975 A | | 4/1993 |
| JP | 11248549 | | 9/1999 |
| WO | WO 00/47964 | | 8/2000 |
| WO | WO 01/64430 A1 | | 9/2001 |

OTHER PUBLICATIONS

Tamura, T. JP11-248549. Machine Translation. Date: Mar. 18, 2009.*
Jelinski, T. JP05-099754. Machine Translation. Date: Mar. 18, 2009.*
International Search Report, Dec. 9, 2000.
Japanese Office Action dispatch date Jul. 8, 2008 (w / English Translation).

* cited by examiner

*Primary Examiner*—Walter D Griffin
*Assistant Examiner*—Bobby Ramdhanie
(74) *Attorney, Agent, or Firm*—RatnerPrestia

(57) ABSTRACT

The invention pertains to a method, a system and a component for systematically and automatically controlling a product, whose preservation in a distribution circuit depends on temperature, in particular a product subjected to a cold chain. The method includes: affixing, on the product, a marker including elements, in particular the bars of a bar code, intended to be identified by automatic processing units, fixing a component on the product. The component includes at least one part including a mask intended for masking the elements of the marker, at least temporarily, without modifying them, when (i) the temperature of the product exceeds a specific temperature threshold or (ii) when the preservation conditions differ from a specific reference level, in particular characterized by the exceeding of a specific temperature threshold for a longer duration than a specific duration or by the exceeding of a specific preservation duration.

6 Claims, 6 Drawing Sheets

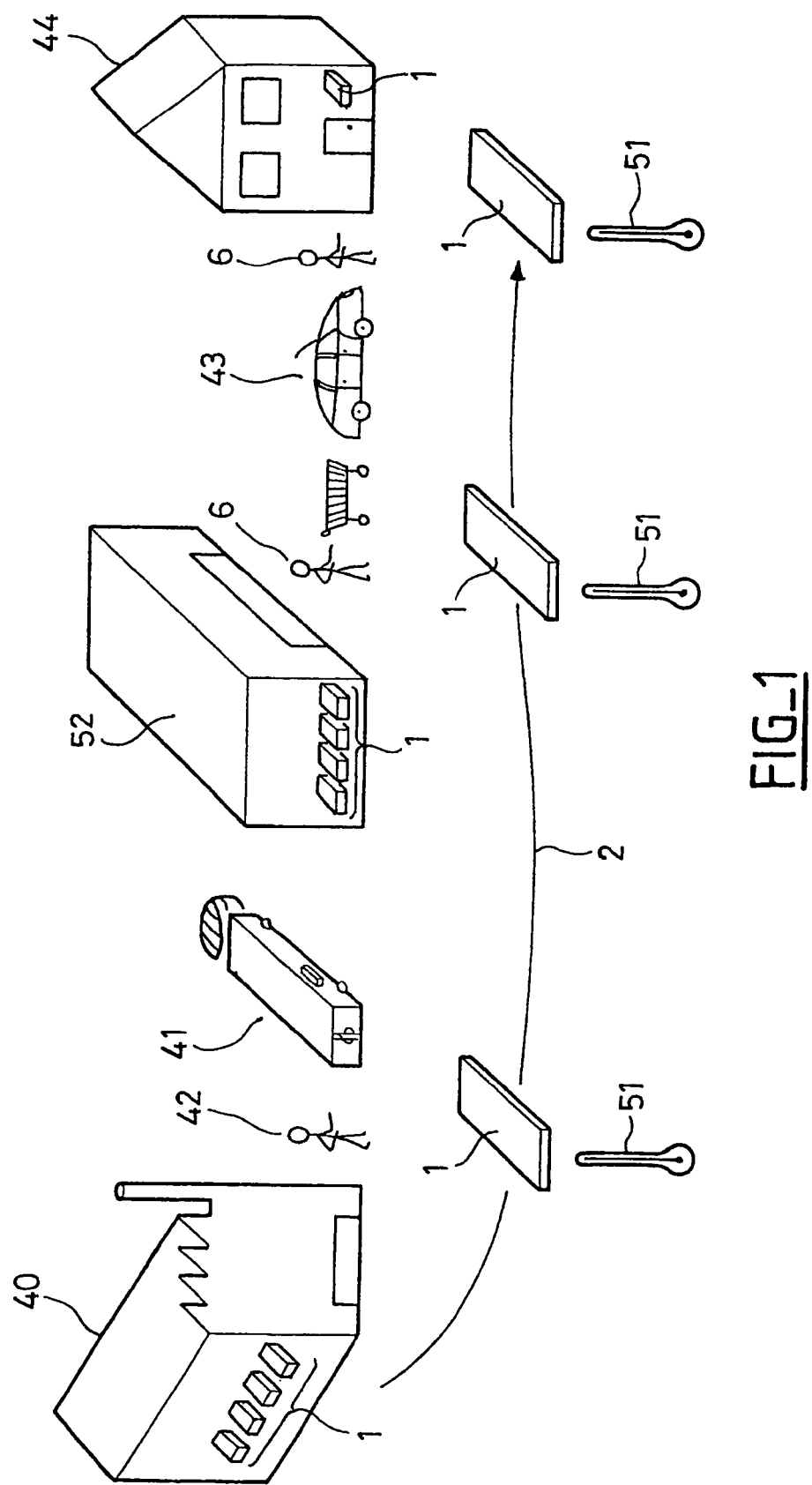
FIG_1

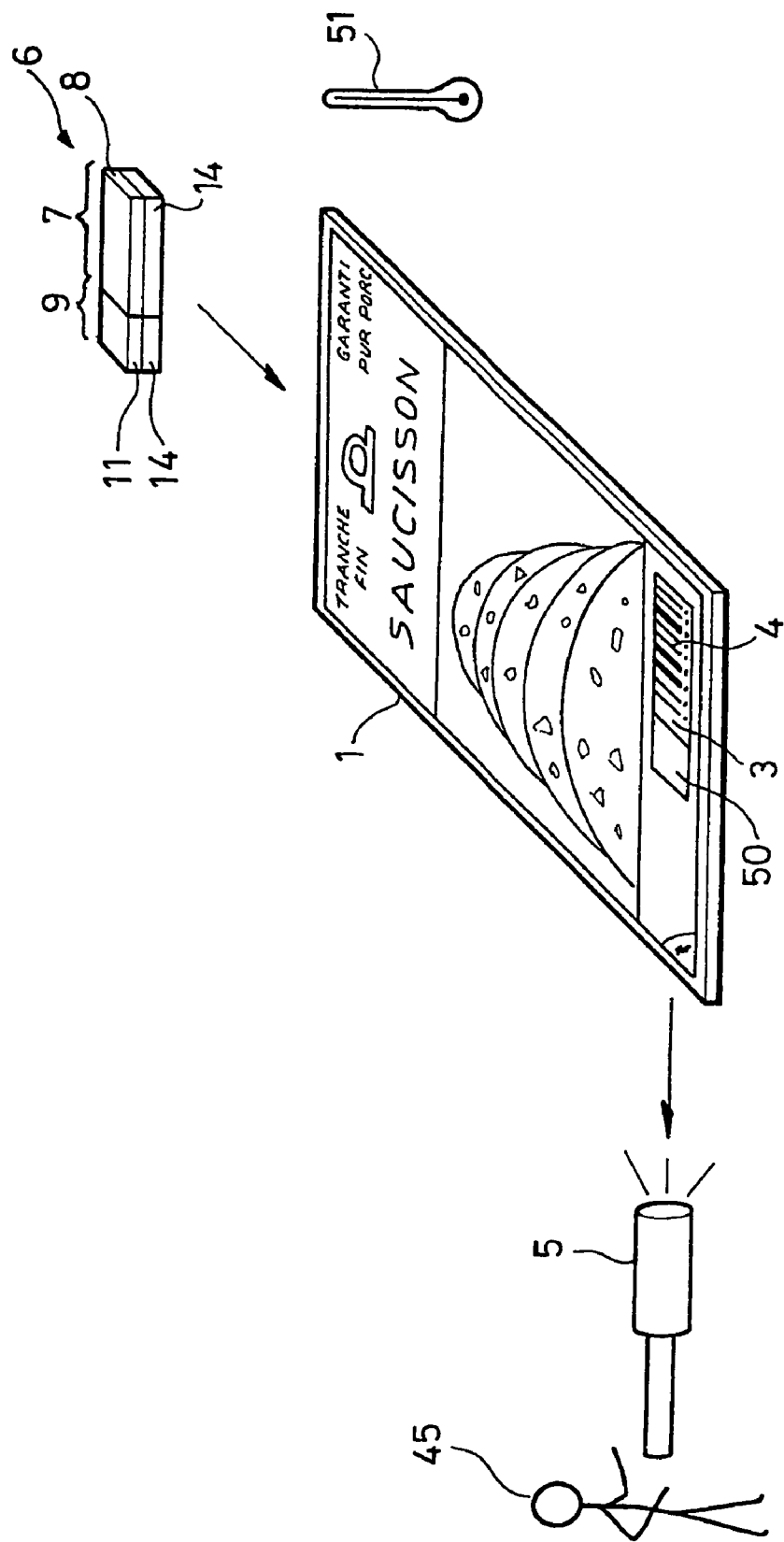
FIG_2

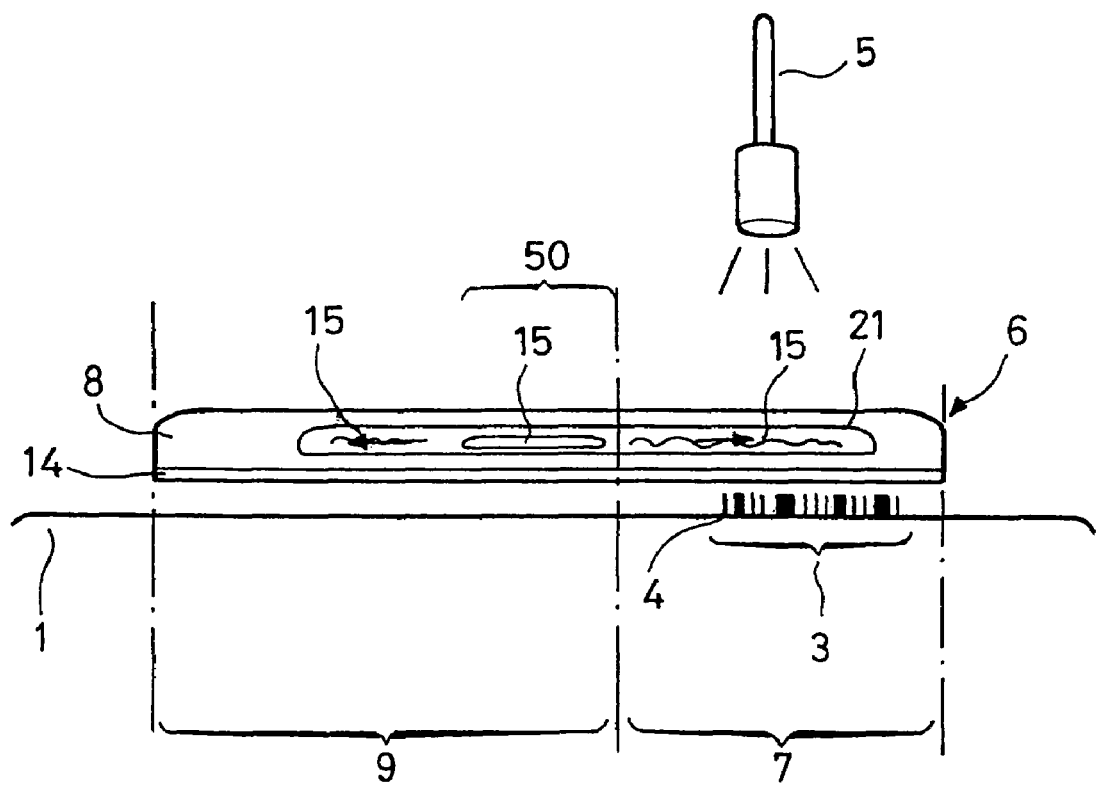
FIG_3

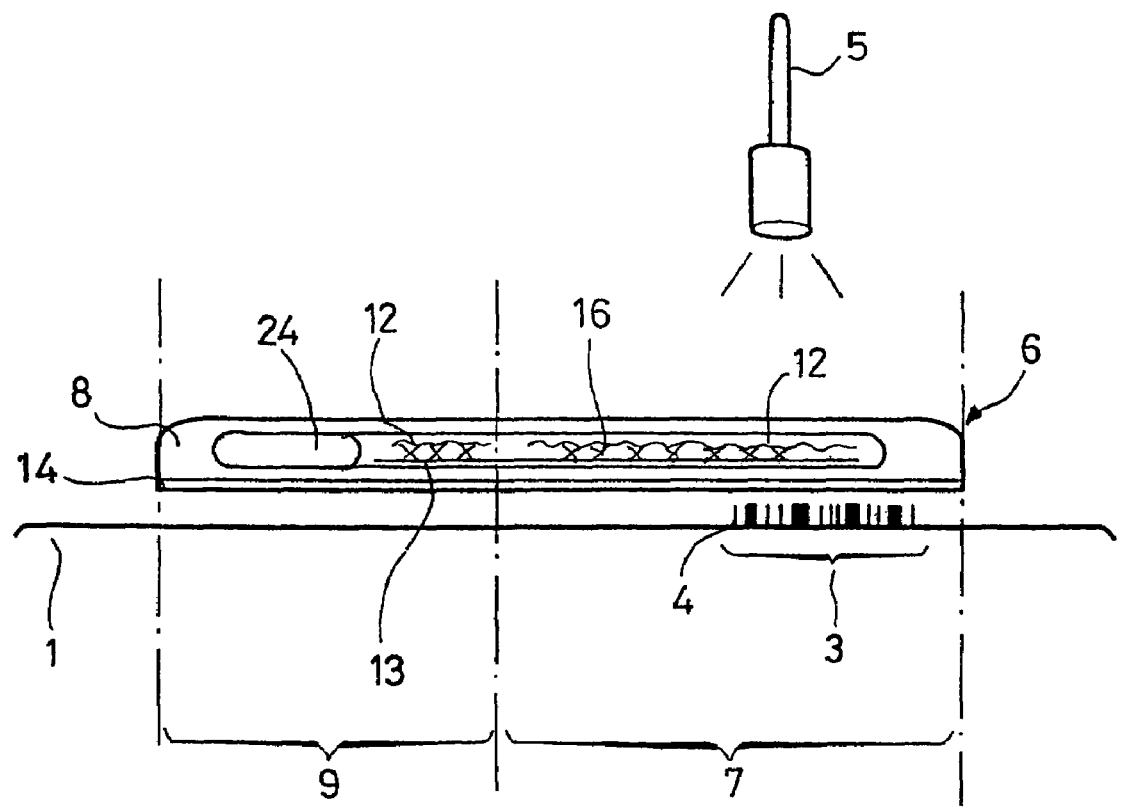
FIG_4

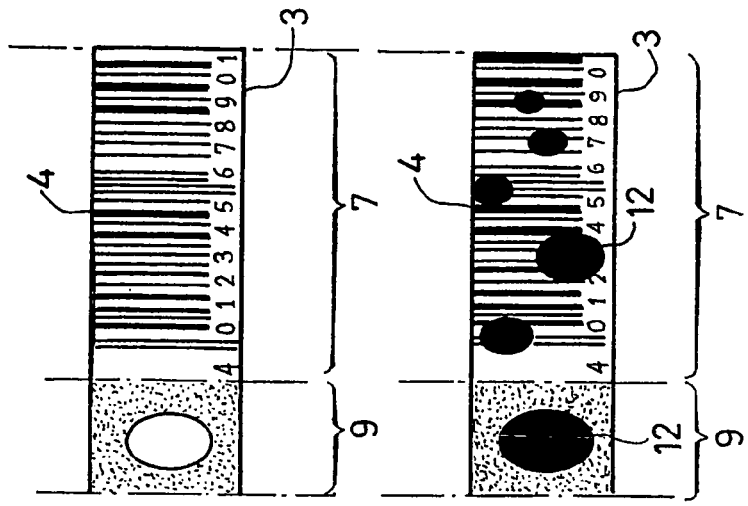
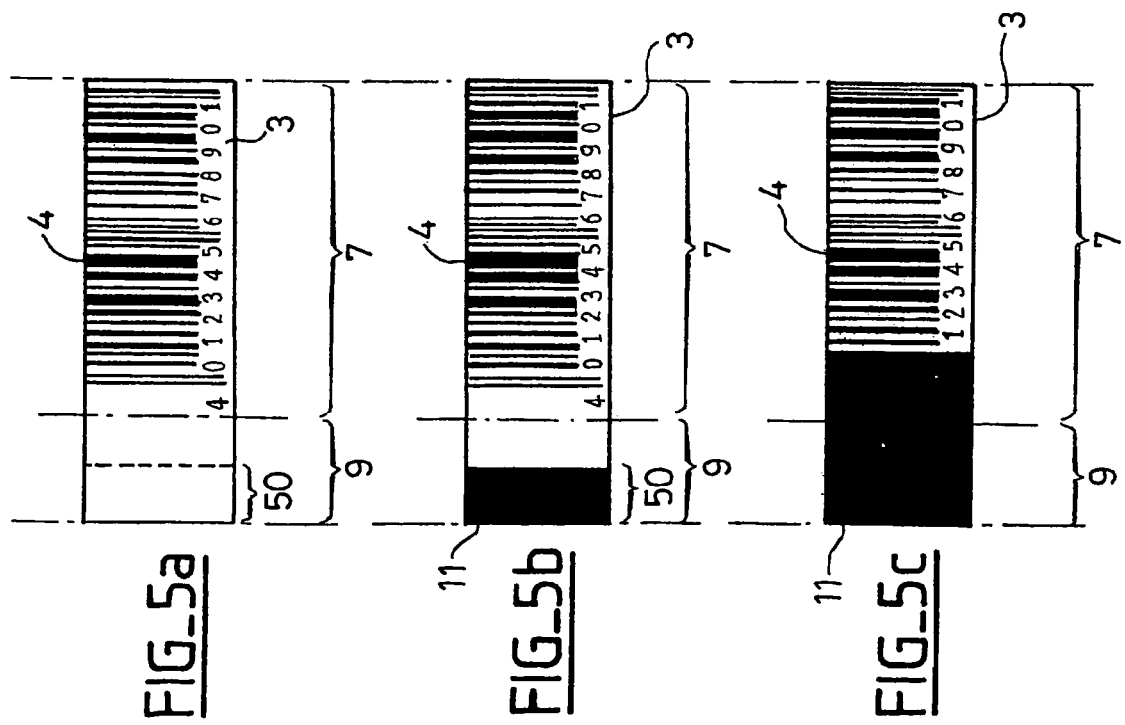

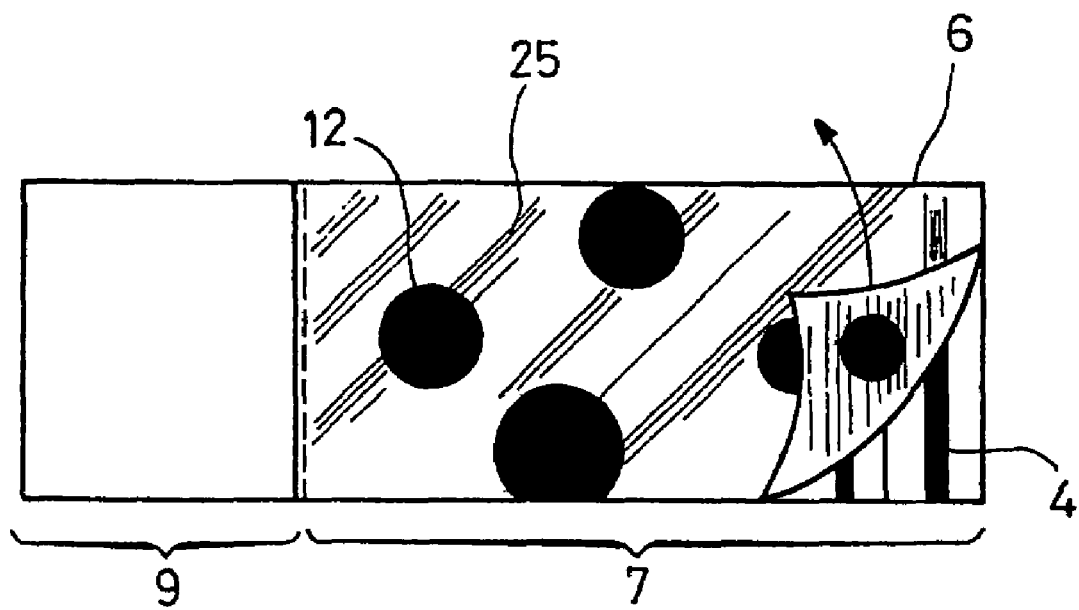

METHOD, SYSTEM AND COMPONENT FOR CONTROLLING THE PRESERVATION OF A PRODUCT

PERTINENT FIELD, PRIOR ART, PROBLEM POSED

The present invention pertains to a method, a system and a component for systematically and automatically controlling a product, whose preservation in a distribution circuit depends on the temperature, in particular a product subjected to a cold chain.

Faced with increasing needs for traceability of heat-sensitive products coming, in particular, from the participants of the farm-produce and health markets, a number of operators have developed and marketed visual temperature exceeding indicators. Often designated by the expression "indicator of a break in the cold chain" or even "freshness chip," these solutions, presented in the form of labels, did not have the expected success, in particular because of difficulties with reading and subjective interpretation of the status of the indicators.

In order to provide a response to users regarding their concern for objectivity of the control of the compliance with preservation temperatures, some prior-art documents consequently propose correlating the legibility of a bar code with the compliance or noncompliance with the preservation temperatures of the product related thereto.

PRIOR ART

The prior-art solutions, analyzed below, combine the use of the bar code with different types of colored heat indicators. These prior-art solutions are described in the following documents, in particular:

WO 01 64430 A (LIFELINES TECHNOLOGY INC), published on Sep. 7, 2001 (09-07-2001), hereinafter called document D1, EP 0 250 217 A (GENERAL ELECTRIC CO PLC), published on Dec. 23, 1987 (12-23-1987), hereinafter called document D2, DE 199 12 529 A (HERBENER HEINZ GERD; VOGELS NIKOLAUS (DE)), published on Sep. 28, 2000 (09-28-2000), hereinafter called document D3, WO 00 47964 A (TEMP TELL LIMITED; TESTER RICHARD (GB)), Aug. 17, 2000 (08-17-2000), hereinafter called document D4.

Either the prior-art solutions impose the use of printing techniques integrating the systems of heat indicators described. This is the case in documents D2 and D4, which propose reproducing all or some of the component elements of a bar code on a medium by laying down microencapsulated materials sometimes (document D2), and sometimes heat-sensitive materials (lipids) (document D4).

Or the prior-art solutions impose selecting a bar code printing medium (paper, plastic, . . . ), specifically treated by means of the heat-sensitive chemical components (document D1) or varnish, delaying the activation of the heat indicators (document D3).

Thus, the bar code indirectly integrates new information that is accessible to consumers and to professionals: If the heat-sensitive product successfully passes all the steps, in which its bar code is read optically (receipt of logistical units, passage at cash registers, . . . ), and it is thus found in the refrigerator of the consumer, the latter is certain that the preservation temperatures were complied with until then.

Thus, the point of such methods is to obtain a means of systematic and objective control of the compliance with the preservation temperatures over time.

PROBLEM POSED

Nevertheless, the classical bar code printing techniques and components are vastly modified, which implies the appearance of new, very marked industrial constraints that are widely rejected by potential users.

Moreover, all the prior-art solutions show a direct and irreversible degradation of all or some of the component elements of the bar codes. The data held in these codes continue to be invaluable to the professionals and must be able to be accessible to them after the detection and setting aside of the suspect heat-sensitive products.

The present invention solves the problems stated above.

SUMMARY OF THE INVENTION

Method

The present invention pertains to a method for systematically and automatically controlling a product, whose preservation in a distribution circuit depends on the temperature, in particular a product subjected to a cold chain.

The method according to the present invention comprises the following steps:

the step of affixing, on the product, a marker comprising elements, in particular the bars of a bar code, intended to be identified by the automatic processing units managing the marketing of the product between the economic participants in question, in particular between a distributor and a consumer or between a pharmaceutical laboratory and a hospital, the step of fixing a component on the product.

The component comprises at least one part comprising masking means intended to mask the elements of the marker, at least temporarily, without modifying them, when (i) the temperature of the product exceeds a specific temperature threshold or (ii) when the preservation conditions differ from a specific reference level, in particular characterized by the exceeding of a specific temperature threshold for a duration longer than a specific duration, or by the exceeding of a specific preservation duration.

The results of the combination of the technical features are that under the circumstances mentioned above:

the automatic processing units can no longer read the markers, on the other hand, a regulatory agency may decide to make the markers legible again.

Preferably, according to the present invention, the method is such that the part of the component making it possible to mask the elements of the marker at least temporarily is embodied in a removable form. Thus, in case of masking the marker, the regulatory agency may decide to remove the removable part of the component in order to make the markers legible again.

Preferably, according to the present invention, the method is such that the component comprises a part irreversibly fixed on the product. The irreversibly fixed part comprises an indicator of changes in the preservation conditions, in particular an indicator of a break in the cold chain. The result of the combination of technical features is that if the preservation conditions are changed, the products in question can be identified beyond dispute.

Preferably, according to a first embodiment variant of the present invention, the method is such that, to mask the elements of the marker, a first substance intended to act as a screen between the marker and the automatic processing units is diffused above the marker by means of a migrant physicochemical reaction.

Preferably, according to a second embodiment variant of the present invention, the method is such that, to mask the elements of the marker, an optical property of a second substance intended to act as a screen between the marker and the automatic processing units is modified via a controlled growth of a population of microorganisms above the marker.

The population of microorganisms is placed on a culture substrate. The controlled growth of the population of microorganisms comprises an activation process. Thus, when the activation process is deactivated, handling the second substance at ambient temperature does not induce the controlled growth of the population of microorganisms.

Preferably, in the case of this second embodiment variant of the present invention, the method additionally comprises the step of inhibiting the growth of the population of microorganisms. The growth of the population of microorganisms is inhibited during the handling phases of the culture substrate. The method additionally comprises the step of disinhibiting the population of microorganisms during the marketing of the product in the distribution circuit, in particular in the cold chain. Thus, the growth of the population of microorganisms becomes possible.

Preferably, in the case of this second embodiment variant of the present invention, the method is such that:

to inhibit the population of microorganisms, it is dehydrated, to disinhibit the population of microorganisms, it is rehydrated.

Preferably, according to another embodiment variant of the present invention, the method additionally comprises the step of placing the population of microorganisms on a culture substrate in a medium having in particular an acid pH, inhibiting the growth of the population of microorganisms. Thus, the growth of the population of microorganisms is inhibited during the handling phases of the culture substrate.

The method additionally comprises the step of adjusting the pH of the medium, in particular by the release of water, during its affixing on the marker. The result of the combination of technical features is that the growth of the population of microorganisms becomes possible.

System

The present invention also pertains to a system for systematically and automatically controlling a product, whose preservation in a distribution circuit depends on the temperature, in particular a product subjected to a cold chain.

The system comprises:

a marker, affixed on the product, comprising elements, in particular the bars of a bar code, intended to be identified by automatic processing units managing the marketing of the product between the economic participants in question, in particular between a distributor and a consumer or between a pharmaceutical laboratory and a hospital, a component, fixing means for fixing the component on the product at the location of the marker.

The component comprises at least one part comprising masking means intended to mask the elements of the marker, at least temporarily, without modifying them, when (i) the temperature of the product exceeds a specific temperature threshold or (ii) when the preservation conditions differ from a specific reference level, in particular characterized by the exceeding of a specific temperature threshold for a duration longer than a specific duration, or by the exceeding of a specific preservation duration.

The result of the combination of technical features is that the automatic processing units can no longer read the markers under the circumstances mentioned above. On the other hand, a regulatory agency may decide to make the markers legible again.

Preferably, according to the present invention, the system is such that the fixing means fix the part of the component making it possible to mask the elements of the marker at least temporarily on the product in a removable manner. Thus, in case of masking the marker, the regulatory agency may decide to remove the removable part of the component in order to make the markers legible again.

Preferably, according to the present invention, the system is such that the component comprises a part irreversibly fixed on the product. The irreversibly fixed part comprises an indicator of changes in the preservation conditions, in particular an indicator of a break in the cold chain. The result of the combination of technical features is that if the preservation conditions are changed, the products in question can be identified beyond dispute.

Preferably, according to a first embodiment variant of the present invention, the system is such that the masking means diffuse a first substance intended to act as a screen between the marker and the automatic processing units above the marker by means of a migrant physicochemical reaction.

Preferably, according to a second embodiment variant of the present invention, the system is such that the masking means modify an optical property of a second substance intended to act as a screen between the marker and the automatic processing units via a controlled growth of a population of microorganisms above the marker. The controlled growth of the population of microorganisms comprises an activation process. Thus, when the activation process is deactivated, the handling of the second substance at ambient temperature does not induce the controlled growth of the population of microorganisms.

Preferably, in the case of this second embodiment variant of the present invention, the population of microorganisms is placed on a culture substrate. The system additionally comprises inhibition means for inhibiting the growth of the population of microorganisms on the culture substrate. Thus, the growth of the population of microorganisms is inhibited during the phases of handling the culture substrate at ambient temperature. The system additionally comprises disinhibition means for disinhibiting the population of microorganisms during the marketing of the product in the distribution circuit, in particular in the cold chain. Thus, the growth of the population of microorganisms becomes possible.

Preferably, according to the present invention, the system is such that:

the inhibition means for inhibiting the population of microorganisms comprise dehydration means, the disinhibition means for disinhibiting the population of microorganisms comprise rehydration means.

Preferably, according to the present invention, the population of microorganisms is placed on a culture substrate. The culture substrate is located in an impermeable pouch, with the pouch containing a culture medium. The pH of the culture medium is selected suitably, in particular an acid pH, to inhibit the growth of the population of microorganisms. Thus, the growth of the population of microorganisms is inhibited during the handling phases of the culture substrate.

The masking means additionally comprise adjustment means for adjusting the pH of the medium, in particular by the release of water. The pH adjustment means are particularly in the form of a perforatable capsule, containing water, located inside the pouch. Thus, the growth of the population of microorganisms becomes possible after fixing the component on the product at the location of the marker.

Component

The present invention also pertains to a component for systematically and automatically controlling a product, whose preservation in a distribution circuit depends on the temperature, in particular a product subjected to a cold chain.

A marker was affixed on the product. The marker comprises elements, in particular the bars of a bar code, intended to be identified by automatic processing units managing the marketing of the product between the economic participants in question, in particular between a distributor and a consumer or between a pharmaceutical laboratory and a hospital.

The component comprises fixing means for fixing the component on the product at the location of the marker. At least one part of the component comprises masking means for masking the elements of the marker, at least temporarily, without modifying them, when (i) the temperature of the product exceed a specific temperature threshold or (ii) when the preservation conditions differ from a specific reference level, in particular characterized by the exceeding of a specific temperature threshold for a duration longer than a specific duration, or by the exceeding of a specific preservation duration.

The result of the combination of technical features is that the automatic processing units can no longer read the markers under the circumstances mentioned above. On the other hand, a regulatory agency may decide to make the markers legible again.

Preferably, according to the present invention, the component is such that the fixing means fix the part of the component making it possible to mask the elements of the marker at least temporarily on the product in a removable manner. Thus, in case of masking the marker, the regulatory agency may decide to remove the removable part of the component in order to make the markers legible again.

Preferably, according to the present invention, the component comprises a part irreversibly fixed on the product. The irreversibly fixed part comprises an indicator of changes in the preservation conditions, in particular an indicator of a break in the cold chain. The result of the combination of technical features is that if the preservation conditions are changed, the products in question can be identified beyond dispute.

Preferably, according to a first embodiment variant of the present invention, the component is such that the masking means diffuse a first substance intended to act as a screen between the marker and the automatic processing units above the marker by means of a migrant physicochemical reaction.

Preferably, according to a second embodiment variant of the present invention, the component is such that the masking means modify an optical property of a second substance intended to act as a screen between the marker and the automatic processing units via a controlled growth of a population of microorganisms above the marker. The controlled growth of the population of microorganisms comprises an activation process. Thus, when the activation process is deactivated, the handling of the second substance at ambient temperature does not induce the controlled growth of the population of microorganisms.

Preferably, in the case of this second embodiment variant according to the present invention, the component additionally comprises inhibition means for inhibiting the growth of the population of microorganisms placed on a culture substrate. The result of the combination of technical features is that the growth of the population of microorganisms is inhibited during the phases of handling the culture substrate at ambient temperature. The component additionally comprises disinhibition means for disinhibiting the population of microorganisms during the marketing of the product in the distribution circuit, in particular in the cold chain. Thus, the growth of the population of microorganisms becomes possible.

Preferably, according to the present invention, the component is such that:

the inhibition means for inhibiting the population of microorganisms comprise dehydration means, the disinhibition means for disinhibiting the population of microorganisms comprise rehydration means.

Preferably, according to the present invention, the population of microorganisms is placed on a culture substrate. The culture substrate is located in an impermeable pouch, with the pouch containing a culture medium. The pH of the culture medium is selected suitably, in particular an acid pH, to inhibit the growth of the population of microorganisms. Thus, the growth of the population of microorganisms is inhibited during the handling phases of the culture substrate. The masking means additionally comprise adjustment means for adjusting the pH of the medium, in particular by the release of water. The pH adjustment means are particularly in the form of a perforatable capsule, containing water, located inside the pouch. Thus, the growth of the population of microorganisms becomes possible after fixing the component on the product at the location of the marker.

BRIEF DESCRIPTION OF THE DRAWINGS

Other characteristics and advantages of the present invention shall become apparent upon the reading of the description of embodiment variants of the present invention, which are given by way of indicative and nonlimiting example, and from FIG. 1, which schematically shows the marketing of a product in the particular case of the use of a cold chain, FIG. 2, which schematically shows a product subjected to a cold chain and comprising a marker intended in particular for activating automatic processing units managing the marketing of the product, FIG. 3, which schematically shows a first embodiment variant of the masking means for masking the marker 3 in case of a break in a cold chain, FIG. 4, which schematically shows a second embodiment variant of the masking means for masking the marker 3 in case of a break in a cold chain, FIGS. 5a, 5b, 5c and 6a, 6b, which schematically show the masking of the marker in the case of the first and the second embodiment variants of the deactivation means, FIG. 7, which shows a component comprising a removable masking part.

DETAILED DESCRIPTION

In general, the goal of the system according to the present invention is to make it possible to systematically and automatically control a product 1, whose preservation in a distribution circuit 2 depends on the temperature 51.

In this case and in a first series of applications, the system may take the form of a Time Temperature Integrator and may thus just as easily reveal a critical accumulation of abnormal temperature elevations in relation to the reference temperature, as a critical accumulation of abnormal drops in temperature.

For example, an application of the system makes it possible to reveal the poor preservation conditions of a deep-frozen product that usually has to be preserved at −18° C. The deep-frozen products do not have a preservation limit date, and consequently, only temperature exceedings can alter the quality of the products. The risk for critical accumulation of breaks in the cold chain is all the more important because the product passes through the hands of a large number of middlemen before arriving in the freezer of the final consumer.

For example, in the farm-produce industry, the hot preserved meals are kept at a temperature greater than 63° C. until the moment of consumption. An application of the system makes it possible to reveal the accumulations of exposure of the product to temperatures lower than the recommended temperature of 63° C.

In this case and in a second series of applications, the system may take the form of a threshold exceeding indicator and this time reveal the exceeding of the reference temperature towards lower or higher temperatures according to the configuration.

For example, some products need to be sterilized and are therefore brought to very high temperatures. Some types of milks, for example, to be able to be marketed must be heated to more than 140° C. (Ultrahigh Temperature milk). The goal of an application of the system is to check that the temperature of 140° C. was readily reached at a given moment.

For example, below −4° C., tartar deposits form in wine bottles due to the precipitation of the salts of tartaric acid, which are little appreciated by the consumer because they are comparable to defects. An application of the system makes it possible to instantly reveal these temperature drops, as soon as the reference temperature is exceeded.

The system may be configured both according to a reference temperature and according to the shelf life of the product.

In this second case, the system passes the poor preservation conditions on to the shelf life of the product. If the reference temperature is not exceeded, the performance of the system over time is identical to the normal degradation process of the product.

For example, some products, in particular fresh products, have an Expiration Date, beyond which the product is no longer consumable even if the preservation conditions haven been correctly complied with. On the other hand, if breaks in a cold chain are recorded, the Expiration Date is all the more advanced (shortened) because the breaks in a cold chain are long and occur at elevated temperatures. The label may simulate this operation: It has a mechanism of normal degradation as long as the preservation conditions are complied with and it sees its mechanism of degradation accelerated if the temperature exceeds the recommended preservation temperature, which will lead, at the end of the degradation phase, to the masking of the marker before the theoretical expiration date.

For example, some products on the farm-produce market must be preserved below 4° C. from their departure from the factory until they reach the home of the final consumer, passing through the transporters and the distributor. The accidental exceeding of this reference temperature during one of these steps does not inevitably make a product unfit for consumption, but decreases the duration during which the product is consumable. The accumulation of these exceedings over time must be controlled.

The system according to the present invention shall be described in the particular case of a product 1 subjected to a cold chain.

FIG. 1 schematically shows the marketing of products 1 using a cold chain. The products 1 are manufactured and maintained within a specific temperature in a factory 40, belonging to an industrialist 42, and then they are transported, by means of a refrigerated truck 41, to a distributor 52. A consumer 6 purchases the products 1 by going to the fresh product counter of the distributor 52. The consumer transports the products 1 to his home 44 by means of a private vehicle 43 belonging to him. A break in the cold chain is then capable of occurring at any moment, from the stage of the manufacture of the products 1 up to the stage of their consumption by the consumer, in particular because of a breakdown of refrigerating equipment or even due to the negligence of a consumer 6, who, for example, might delay storing the products 1 in a refrigerator. Therefore, it appears to be necessary to be able to perform a check of the products 1 at each step of their marketing. The goal of this checking is to systematically and automatically detect a product 1 having undergone a break in the cold chain.

FIG. 2 schematically shows a product 1, using a cold chain, like the one shown in FIG. 1. The product 1, which takes the form of a food tray containing slices of sausage here, comprises a marker 3 intended for activating an infrared type automatic processing unit 5. As is also shown, the marker 3 consists, in a manner known per se, of a bar code 3 comprising elements 4, in particular the bars 4 of the bar code 3. These bars are intended to be identified by the automatic processing unit 5. Nevertheless, it might be another type of marker 3, in particular an electronic or magnetic marker 3. Affixing means, for example, printing means, are used for affixing the marker 3 on the product 1. In FIG. 2, the automatic processing unit 5 takes the form, known per se, of an infrared pointer used by a cashier 45 of a supermarket to record and invoice the product 1 to a consumer.

A component 6 comprises, on a part 7 dedicated for this purpose, masking means 8, which make it possible to mask the elements 4 of the marker 3, at least temporarily, without modifying them, when the temperature of the product 1 exceeds a specific temperature threshold. Embodiment variants of the component 6 and of the masking means 8 will be described below, in particular with reference to FIGS. 3 through 6.

For example, in the case of a marker of the electromagnetic type, the marketing of the product is linked with the comprehension of a signal sent by the marker. The masking element may be designed so as to mask the signal sent by sending another signal of the same nature which will cause interference with the signal of the marker. In this way, the masking element prevents the identification of the product.

Fixing means 14 make it possible to fix the component 6 on the product 1 at the location of the marker 3.

In the case of the embodiment variants shown in FIGS. 2 through 6, the fixing means 14 fix the part 7 of the component 6 making it possible to mask the elements 4 of the marker 3 at least temporarily on the product 1 in a removable manner. Thus, in case of masking the marker 3, the regulatory agency may decide to remove the removable part 7 of the component 6 in order to make the markers 3 legible again.

To this end, it is possible, e.g., to cover a bar code of a component of the Time Temperature Integrator type, consisting of an adhesive, transparent medium integrating an initially transparent, detachable film 25 (see FIG. 7). When a critical accumulation of the temperature being exceeded over time has passed, the transparent film covering the bar code will become opaque, as is described below. The film covering the bar code will stop being transparent and will act as a screen between the bars and the optical reading beam. The bar code is masked and its reading is made impossible in this way, as the film thus made opaque is not separated from the medium. This separation is made possible due to the use of special adhesives, whose adhesive power will have been defined to make possible the detachment, by peeling, of the film of the transparent medium covering the bar code. Once the film 25 has been detached, the data carried in the bar code are decipherable again (see FIG. 7). At any rate, the bar code has not been modified, altered or destroyed.

It is also possible, for example, to cover the bar code of a Time Temperature Integrator, consisting only of a detachable film directly affixed to the packaging. In this case it is not necessary to provide a transparent medium.

It is also possible, for example, to use an adhesive with strong adhesive power for fixing the component, in such a way that the component cannot be detached without altering the packaging of the product. In this case, to make it possible to read the bar code, after masking same with the component, specific processing means can be used (particularly electric, magnetic, chemical or even mechanical means) to make the component transparent again. These means are designed to destroy the effects of the elements masking the component (in particular, by modifying their chemical or physical properties). At any rate, the bar code has not been modified, altered or destroyed.

In the case of the embodiment variants shown in FIGS. 2 through 6, the component 6 comprises a fixed part 9 irreversibly fixed by suitable fixing means on the product 1. The irreversibly fixed part 9 comprises an indicator 50 of changes in the preservation conditions, in particular an indicator 50 of a break in the cold chain. Thus, if the preservation conditions have changed, the products 1 in question can be identified beyond dispute.

The indicator located on the sealed, fixed part delivers a message to the final consumer and to the distributor.

For the final consumer, it is the guarantee that the system has not been falsified by any intervening party before him. In fact, the adhesive power of the adhesives used for sealing the fixed part lead to a direct and visible degradation of the packaging or of the product in case of an attempt to remove the adhesive.

For the distributor, it is the guarantee that a malevolent consumer will not be able to replace an untouched indicator with an altered indicator for attempting to provide proof of the poor quality of a product, while this product has still not left the warehouse. It is also the guarantee that a transporter will not be able to hide a break in the cold chain.

Finally, the separable character of the removable part and of the fixed part makes it possible for the system to be adapted to the graphic structure of the packaging: The fixed part must be placed in a place visible to the consumer, while the zone receiving the removable part coincides with the location of the marker. The latter is often printed discreetly on the packaging.

It shall be noted that the system according to the invention generally comprises:
 a marker 3, affixed on the product 1, comprising elements 4, in particular the bars 4 of a bar code 3, intended to be identified by automatic processing units 5 managing the marketing of the product 1 between the economic participants in question, in particular between a distributor and a consumer or between a pharmaceutical laboratory and a hospital,
 a component 6,
 fixing means 14 for fixing the component 6 on the product 1 at the site of the marker 3.

The component 6 comprises at least one part 7 comprising masking means 8 for masking the elements 4 of the marker 3, at least temporarily, without modifying them, when (i) the temperature of the product 1 exceeds a specific temperature threshold or (ii) when the preservation conditions differ from a specific reference level, in particular characterized by the exceeding of a specific temperature threshold for a duration longer than a specific duration.

The result of the combination of technical features is that the automatic processing units can no longer read the markers 3 under these circumstances. On the other hand, a regulatory agency may decide to make the markers 3 legible again.

A first embodiment variant of the component 6 and of the masking means 8 for masking the marker 3 in case of a break in the cold chain in a distribution circuit 2 shall now be described with reference to FIG. 3. The masking means 8 comprise an impermeable, flat pouch 21, containing physicochemical reagents. In case of a break in the cold chain, i.e., when the specific temperature is exceeded, the physicochemical reagents diffuse a first substance 15 acting as a screen on the surface of the marker 3, inside the impermeable, flat pouch 21, by means of a migrant physicochemical reaction. Thus, when the specific temperature is exceeded, the first substance 15 progressively forms a screen between the marker 3 and the automatic processing unit 5. The automatic processing unit 5 is then deactivated. The break in the cold chain is therefore detected: As FIG. 3 shows, the physicochemical reagents 15 migrate from a zone 50, which does not cover the elements 4 of the marker 3; therefore, it is only after a certain time that the elements 4 of the marker 3 stop being legible.

It was stated above that the system according to the present invention must be configured:
 either according to a reference temperature, only making it possible to reveal the poor preservation conditions,
 or, at the same time, according to a reference temperature and according to the shelf life of the product.

The migrant character of the reaction and the existence of an "untouched" warning zone 50 make it possible to achieve these objectives. In fact, the temperature acts on the viscosity, on which the migration speed of the mask toward the bar code depends. Consequently, the time that the mask will take to conceal the bar code in an "all or nothing," binary manner depends on the area of the warning zone 50, on the temperature and on the duration of exposure to the critical temperatures. It is possible to predetermine the reagents of the migrant reaction and the area of the warning zone 50 so as to embody components (Time Temperature Integrators) revealing the differences in relation to the preservation conditions that are required (the state of freshness) for a given product in a given distribution circuit.

The migrant nature of the physicochemical reaction makes possible a progressive masking by preventing the bar code from being made prematurely illegible, while the product in question is still consumable. The objective is to reduce the risk for removing from the chain heat-sensitive products that are still consumable. The use of a nonmigrant chemical reaction may result in the premature masking of the marker and the removal of the product from the distribution chain during the passage in front of the automatic processing units.

Another advantage of using a migrant physicochemical reaction is to make it possible to retrace a history of the variations of the temperature as a function of the time. In fact, a dividing up of the warning zone 50 preceding the zone of the bar code into a plurality of printed levels makes it possible to follow the migration precisely and to interpret the stage of progression of the mask by correlating it with the state of freshness of the product.

Once all the printed levels have been exceeded and once the critical accumulation threshold of breaks in the cold chain has been reached, the physicochemical reaction migrates to the bar code, making it almost instantly illegible.

A second embodiment variant of the component 6 and the masking means 8 for masking the marker 3 in case of a break in the cold chain in a distribution circuit 2 shall now be described with reference to FIG. 4. Just as in the case of the embodiment variant shown in FIG. 3, the masking means 8 comprise an impermeable flat pouch. This impermeable flat pouch has the reference number 21 in the case of this embodiment variant as well. The impermeable flat pouch 21 contains a culture substrate 13 on which a population of microorganisms 16 is placed. The population of microorganisms 16 develops in a controlled manner when the specific temperature is exceeded. The controlled growth of the population of microorganisms 16 produces a reactive agent that reacts with the medium 22 by modifying an optical property of a second substance 12. In the case of the embodiment variant described with reference to FIG. 4, this second substance 12 is formed by the medium 22 itself. In the case of other embodiment variants, this second substance 12, which is contained in the impermeable flat pouch 21, may be distinct from the medium 22. The second substance 12 forms a screen on the surface of the marker 3. Thus, when the specific temperature is exceeded, the second substance 12 forms a screen between the marker 3 and the automatic processing unit 5. The automatic processing unit 5 is then deactivated. The break in the cold chain is therefore detected.

It was stated above that the system according to the present invention must be configured:

either according to a reference temperature, only making it possible to reveal the poor preservation conditions, or, at the same time, according to a reference temperature and according to the shelf life of the product.

The controlled growth of a population of microorganisms makes it possible to achieve these objectives. In fact, the temperature acts on the rate of growth of the microorganisms and therefore acts on the rate of production of the reactive agent. When a sufficient quantity of reactive agent is produced, it reacts with the medium 22 to change its color relatively quickly (in relation to the time needed to produce the reactive agent). The color of the medium is changed in a few hours. Consequently, the time that the mask will take to conceal the bar code in an "all or nothing," binary manner depends on the temperature and on the duration of exposure to the critical temperatures. It is possible to predetermine the selection of the microorganisms, their quantity, the nature of the second substance 12 (in the case described, the nature of the medium 22) so as to embody components (Time Temperature Integrators) revealing the differences in relation to the preservation conditions required (the state of freshness) for a given product in a given distribution circuit.

The almost instant character of the color change of the medium makes it possible to reveal, with precision, the moment when the product stops being consumable. Moreover, the fact that the color change takes place after a phase of growth of microorganisms prevents the bar code from being made prematurely illegible, while the product in question is still consumable.

The objective is to reduce the risk for removing still consumable, heat-sensitive products from the chain.

The component 6 comprises means for deactivating the controlled growth of the population of microorganisms 16. These deactivation means shall be described below. Thus, when the controlled growth process is deactivated, the handling of the component 6 at ambient temperature between the moment when it is manufactured and that when it is fixed on the product 1 does not induce the controlled growth of the population of microorganisms 16.

In order to deactivate the controlled growth of the population of microorganisms 16, a plurality of embodiment variants are possible.

In the case of a first embodiment variant:

On the one hand, the system comprises inhibition means for inhibiting the growth of the population of microorganisms 1. For example, the inhibition means may comprise dehydration means for this purpose. The population of microorganisms 16 is placed, in the dehydrated state, on the culture substrate 13. In fact, in the dehydrated state, the microorganisms 16 do not proliferate. Thus, the growth of the population of microorganisms 16 is inhibited during the phases of handling the culture substrate 13 at ambient temperature.

On the other hand, the component 6 comprises disinhibition means for disinhibiting the population of microorganisms 16 during the marketing of the product 1 in the distribution circuit 2, in particular in the cold chain. For example, the disinhibition means for disinhibiting the population of microorganisms 16 may comprise, for this purpose, means for rehydrating the microorganisms 16 and/or the culture medium of the microorganisms 16 and/or the culture substrate 13. Thus, the growth of the population of microorganisms 16 becomes possible. The rehydration means are particularly in the form of a perforatable capsule 24 containing water, which is located inside the impermeable flat pouch 21. The rehydration means are activated, the perforatable capsule 24 is perforated, during the use of the means 14 for fixing the component 6 on the product 1. Thus, the growth of the population of microorganisms 16 becomes possible as soon as the capsule 24 is perforated, after fixing the component 6 on the product 1.

In the case of a second embodiment variant, the population of microorganisms 16 is placed on a culture substrate 13. The culture substrate 13 is located in an impermeable pouch 21. The impermeable pouch 21 contains a culture medium 22 (which, as has been seen, may be the second substance 12). The pH of the culture medium 22 is selected suitably, in particular an acid pH, to inhibit the growth of the population of microorganisms 16. Thus, the growth of the population of microorganisms 16 is inhibited during the phases of handling said culture substrate 13. The masking means 8 additionally comprise adjustment means for adjusting the pH of the medium, in particular by release of water, during the fixing of the component 6 on the marker 3. In the case of the variant described, said pH adjustment means are in the form of a perforatable capsule 24 containing water, located inside the impermeable pouch 21. Thus, the growth of the population of microorganisms 16 becomes possible after the fixing of the component 6 on the product 1 at the location of the marker 3 and the perforation of the perforatable capsule 24.

FIGS. 5a, 5b, 5c and 6a, 6b schematically show the masking of the marker 3 in the case of the first and the second embodiment variants of the component 6, shown in FIG. 3 and FIG. 4, respectively.

FIGS. 5a, 5b, 5c show the progressive masking of the marker 3 by the diffusion, described above, of the first substance 11. FIG. 5a shows the marker 3 not having undergone a break in the cold chain. The warning zone 50 is not masked. All the elements 4 of the marker 3, i.e., the bars 4 of the bar code 3, are visible. The marker 3 is therefore capable of activating the automatic processing unit 5 described above. FIG. 5b shows the marker 3 having undergone a brief break in the cold chain. The first substance 11 migrates to the surface of the marker 3, covering the warning zone 50. The marker 3 can therefore no longer activate the automatic processing unit 5. FIG. 5c shows the marker 3 having undergone a prolonged break in the cold chain. The first substance 11 pursues its migration to the surface of the marker 3. The elements 4 of the marker 3 are gradually covered by the first substance 11, thus forming a screen between the marker 3 and the automatic processing unit 5. The product 1 can therefore no longer be sold.

FIGS. 6a and 6b show the masking of the marker 3 by the change in the color of the medium 22. FIG. 6a shows the marker 3 not having undergone a break in the cold chain. All the elements 4 of the marker 3, i.e., the bars 4 of the bar code 3, are visible. The marker 3 is therefore capable of activating the automatic processing unit 5 described above. FIG. 6b shows the marker 3 having undergone a critical accumulation of breaks in the cold chain. The medium 22, having changed color, forms a screen on the surface of the marker 3. The marker 3 can therefore no longer activate the automatic processing unit permitting the marketing of the product 1.

The invention claimed is:

1. System for systematically and automatically controlling a product, whose preservation in a distribution circuit depends on the temperature;

the system comprising:
a marker, affixed on the product, comprising elements, intended to be identified by the automatic processing units managing the marketing of the product,
a component,
fixing means for fixing the component on the product at the location of the marker;
the component including at least one part comprising masking means for masking the elements of the marker without modifying them, when (i) the temperature of the product exceeds a specific temperature threshold or (ii) when the preservation conditions differ from a specific reference level, or by exceeding a specific preservation duration;
whereby when the elements of the marker are masked by the masking means and the automatic processing units can no longer read the markers;
wherein:
the fixing means are configured to fix at least a portion of the masking means on the product so that the masking means may be removed;
when the elements of the marker are masked, the removable portion of the masking means is configured to be removed by a regulatory agency to make the marker legible again; and
the component further includes an irreversibly fixed part including an indicator of any changes in the preservation conditions of the product, the irreversibly fixed part including an indicator of the changes in the preservation conditions of the product; whereby, when there is a change in the preservation conditions of the product, the product affected by this change can be identified beyond dispute even if the masking means have been removed.

2. System in accordance with claim 1; the system being such that the masking means diffuse a first substance intended to act as a screen between the marker and the automatic processing units above the marker by means of a migrant physicochemical reaction.

3. System in accordance with any claim 1; the system being such that the masking means modify an optical property of a second substance intended to act as a screen between the marker and the automatic processing units via a controlled growth of a population of microorganisms above the marker; the controlled growth of the population of microorganisms comprising an activation process;

whereby, when the activation process is deactivated, the handling of the component at ambient temperature does not induce the controlled growth of the population of microorganisms.

4. System in accordance with claim 3; the population of microorganisms being placed on a culture substrate; the system additionally comprising:
inhibition means for inhibiting the growth of said population of microorganisms;
whereby the growth of the population of microorganisms is inhibited during the phases of handling the culture substrate at ambient temperature;
the system additionally comprising:
disinhibition means for disinhibiting the population of microorganisms during the marketing of the product in the distribution circuit;
whereby the growth of the population of microorganisms becomes possible.

5. System in accordance with claim 4; the system being such that:
the inhibition means for inhibiting the population of microorganisms comprise dehydration means,
the disinhibition means for disinhibiting the population of microorganisms comprise rehydration means.

6. System in accordance with claim 3; the population of microorganisms being placed on a culture substrate; the culture substrate being located in a impermeable pouch; the pouch containing a culture medium; the pH of the culture medium being selected suitably, for inhibiting the growth of the population of microorganisms;
whereby the growth of the population of microorganisms is inhibited during the phases of handling the culture medium;
the masking means additionally comprising adjustment means for adjusting the pH of the medium; the pH adjustment means are in the form of a perforatable capsule, containing water, located inside the impermeable pouch;
whereby the growth of the population of microorganisms becomes possible after fixing the component on the product at the location of the marker.

* * * * *